(12) United States Patent
Vogel et al.

(10) Patent No.: US 6,355,770 B1
(45) Date of Patent: Mar. 12, 2002

(54) SCUFF AND BLOOM RESISTANT POLYAMIDE RESIN COMPOSITIONS

(75) Inventors: Timothy C. Vogel, Langhorne, PA (US); Sobhy El-Hefnawi, Mt. Holly, NJ (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/538,450

(22) Filed: Mar. 30, 2000

Related U.S. Application Data

(60) Provisional application No. 60/126,879, filed on Mar. 30, 1999.

(51) Int. Cl.[7] .......................... C08G 69/34; B05D 1/00; B05D 5/00; C08L 79/08; C08L 77/00
(52) U.S. Cl. ........................ 528/310; 528/335; 528/336; 528/339; 528/339.3; 528/339.5; 528/338; 528/340; 427/197; 427/202; 427/203; 106/31.13; 106/31.29
(58) Field of Search ............................ 528/339.3, 339.5, 528/310, 338, 339, 335, 336, 340; 106/31.13, 31.29; 427/197, 202, 203

(56) References Cited

U.S. PATENT DOCUMENTS

| | | | |
|---|---|---|---|
| 3,911,160 A | 10/1975 | Neuberg | 427/27 |
| 4,066,585 A | 1/1978 | Schepp et al. | 106/27 |
| 5,098,739 A | 3/1992 | Sarda | 427/197 |
| 5,100,934 A | 3/1992 | Glesias | 523/456 |
| 5,138,027 A | 8/1992 | Van Beek | 528/339.3 |
| 5,214,124 A | 5/1993 | Drawert et al. | 528/335 |
| 5,434,215 A | 7/1995 | Sankaran et al. | 524/763 |
| 5,612,448 A | 3/1997 | Frihart | 528/339.5 |
| 5,807,968 A | 9/1998 | Heinrich et al. | 528/310 |
| 5,948,880 A | 9/1999 | Fischer et al. | 528/339.3 |

*Primary Examiner*—P. Hampton-Hightower
(74) *Attorney, Agent, or Firm*—John E. Drach; Aaron R. Ettelman

(57) ABSTRACT

Compositions comprising: (a) from about 51% to about 99.9% by weight of a polyamide resin component; and (b) from about 0.1% to about 49% by weight of a wax component, wherein the polyamide resin component comprises a reaction product obtained by reaction of a dimerized fatty acid reactant, a carboxylic acid reactant and a diamine reactant, are disclosed for use in thermographic printing. The polyamide resin/wax component compositions disclosed herein exhibit decreased bloom and enhanced scratch/scuff resistance.

24 Claims, No Drawings

SCUFF AND BLOOM RESISTANT POLYAMIDE RESIN COMPOSITIONS

CROSS-REFERENCE TO RELATED APPLICATIONS

This application claims priority, under 35 U.S.C. §119(e), of U.S. Provisional Patent Application No. 60/126,879, filed Mar. 30, 1999, the entire contents of which are incorporated by reference herein.

BACKGROUND OF THE INVENTION

The present invention relates to polyamide resins prepared from dimeric fatty acids. More specifically, the present invention relates to compositions comprising such polyamide resins along with other additives, which are useful as thermographic powders.

Polyamide resins derived from polymeric fat acids have been known for a long period of time and have been developed commercially. Certain resins based on such polyamides have been developed for many uses including, for example, hot melt adhesives, coatings, films and inks, particularly in flexographic and thermographic printing.

Thermographic printing, i.e., raised printing, is a well known process typically involving the layering of ink onto a paper and coating the paper with a thermographic powder containing a polyamide resin which adheres to the ink. The coated paper is heated and the powder melts, fusing with the ink. The resulting print exhibits a raised image having a smooth, glossy surface.

Unfortunately, many of the polyamide resins which have been developed for use in thermographic printing exhibit some undesirable properties which can limit their commercial use. For example, polyamide resins can develop a dull haze over time which is known in the art as "bloom" or "blush". Additionally, polyamide resins can be easily scuffed and/or scratched. Such properties are considered disadvantages in the thermographic printing arts and limit the applications of such polyamide resins to small printing areas such as business cards and stationery. The use of such polyamide resins in large print areas, such as packaging and greeting cards, is generally excluded due in part to the ease with which such surfaces may be scuffed or scratched.

Thus, there is a need in the art for a polyamide resin which can be used as a thermographic powder in a wide variety of applications and printing areas, and which is resistant to bloom, scratching and scuffing.

BRIEF SUMMARY OF THE INVENTION

The present invention includes a polyamide resin composition which is suitable for use as a thermographic printing powder and which is significantly improved in bloom resistance and scratch/scuff resistance, as compared to prior art thermographic polyamide resin powders.

Thus, the present invention includes compositions including a major amount of a polyamide resin and a minor amount of wax. When compared to certain existing polyamide resins, it was surprisingly found that coatings made from these types of compositions are substantially resistant to blooming, scratching and scuffing over long periods of time while maintaining other desirable properties. Accordingly, the compositions are not only useful, e.g., in the small printing areas such as business cards and stationery, but also are useful in the large printing areas such as book covers, greeting cards and packaging boxes.

The present invention includes a composition comprising: (a) from about 51% to about 99.9% by weight of a polyamide resin component; and (b) from about 0.1% to about 49% by weight of a wax component, wherein the polyamide resin component comprises a reaction product obtained by reaction of a dimerized fatty acid reactant, a carboxylic acid reactant and a diamine reactant.

A particularly preferred embodiment of the present invention includes a composition comprising: (a) from about 90% to about 99.9% by weight of a polyamide resin component; and (b) from about 0.1% to about 10% by weight of a wax component comprising a member selected from the group consisting of polyethylene waxes, polytetrafluoroethylene waxes, and mixed polyethylene/polytetrafluoroethylene waxes, wherein the polyamide resin component comprises a reaction product obtained by reaction of: (1) a tall oil fatty acid dimerization product having a dimer content of about 97%, a monomeric content of about 1%, and a trimeric content of about 2%, with (2) a mixture of a monocarboxylic acid having from about 16 to about 20 carbon atoms and azelaic acid, and (3) ethylenediamine; wherein the dimerization product is at least partially hydrogenated, and wherein a ratio of acid equivalents to amine equivalents in said reaction is greater than or equal to about 1.04.

Additionally, the present invention includes a method of enhancing scratch and/or scuff resistance and reducing bloom in a thermographic ink, said method comprising: (a) providing a substrate having a thermographic ink composition disposed thereon; (b) coating the thermographic ink composition with a polyamide resin composition comprising: (a) from about 51% to about 99.9% by weight of a polyamide resin component; and (b) from about 0.1% to about 49% by weight of a wax component, wherein the polyamide resin component comprises a reaction product obtained by reaction of a dimerized fatty acid reactant, a carboxylic acid reactant and a diamine reactant; and (c) heating the substrate for an amount of time and at a temperature sufficient to melt the thermographic ink composition and the polyamide resin composition.

DETAILED DESCRIPTION OF THE INVENTION

The invention is directed to a composition including a major amount by weight of a polyamide resin and a minor amount by weight of a wax. The polyamide resin component is preferably present in an amount of from about 80% to about 99.9% by weight, more preferably from about 90% to about 99.5% by weight, and most preferably from about 95% to about 99.5% by weight, based upon the weight of the composition.

The polyamide resin component can be any suitable polyamide resin. Suitable polyamide resins which exhibit sufficient non-bloom characteristics generally have an acid value (AV) and an amine value (AmV) such that (AV) minus (AmV) is greater than or equal to about 4. Generally, the acid value of a non-bloom resin should be from about 5 to about 10 and the amine value should be less than or equal to about 2, and preferably about 1. Accordingly, the number of acid equivalents reacted with amine equivalents is generally such that the ratio of acid equivalents to amine equivalents is greater than 1, preferably greater than or equal to 1.02, more preferably greater than or equal to 1.04, and most preferably greater than or equal to 1.05.

Preferred polyamide resin components are prepared by reacting a dimerized fatty acid, a carboxylic acid and a diamine. For example, preferred polyamide resins include the reaction product derived from condensation of a dimerized hydrogenated fatty acid in an amount of from about 60 to about 68 percent by weight, stearic acid in an amount of from about 15 to about 40 percent by weight, azelaic acid in an amount of from about 0.5 to about 1.5 percent by weight and ethylene diamine in an amount of from about 6.5 to about 9.5 percent by weight of the polyamide resin. The diamine reactant may also further include a polyamine, however diamines without additional polyamines are preferred. Diamines suitable for use in accordance with the present invention are preferably linear and have from about 2 to about 6 carbon atoms. The diamine reactant can, for example, contain a mixture of ethylene diamine and hexamethylene diamine.

The carboxylic acid reactant preferably contains a mixture of a monocarboxylic acid and a dicarboxylic acid. However, monocarboxylic acid may be used alone with sufficient amounts of dimerized fatty acid. Preferred monocarboxylic acids are linear and contain from about 16 to about 20 carbon atoms. Particularly preferred monocarboxylic acids include stearic acid, isostearic acid and triple pressed stearic acid. Dicarboxylic acids that may be used in accordance with the present invention are preferably linear and contain from about 6 to about 10 carbon atoms. A particularly preferred dicarboxylic acid is azelaic acid.

Dimerized fatty acids which can be used in accordance with the present invention are preferably hydrogenated to reduce aesthetically unpleasing color. The degree of hydrogenation is not critical. A preferred degree of hydrogenation corresponds to an iodine value less than or equal to 110, and more preferably less than or equal to 95. Dimerized fatty acids used in accordance with the present invention may be "crude", i.e., obtained directly from dimerization without distillation, or refined to increase dimer concentration. Generally, refined dimerized acids having a dimer content of about 95% or greater are preferred. In one embodiment, a hydrogenated dimerized fatty acid preferably includes approximately 97 percent by weight of dimerized tall oil fatty acids, with the remainder being monomeric and polymeric fatty acids.

An example of a suitable hydrogenated dimerized tall oil fatty acid is Versadyme® VD58 (Cognis Corp., Cincinnati Ohio), the formula of which is described below, following Table 1. Preferably the stearic acid is selected from the group consisting of triple press stearic acid and isostearic acid. Suitable polyamide resins are described by the formulations present in Tables I (Formulation 1) and II (Formulation 2).

TABLE 1

| FORMULATION 1 | % Equivalents |
| --- | --- |
| Versadyme ® VD58 | 65.4 |
| Iso-Stearic Acid (source: Emery) | 31.5 |
| Azelaic Acid (source: Emery) | 3.1 |
| Ethylene diamine | 100 |

Versadyme® VD 58 comprises dimerized tall oil fatty acids having a dimeric content of ~97%, a monomeric content of ~1% and a trimeric content of ~3%, an acid value of 193–201, saponification value of 198 and an iodine value of approximately 95 (source: Cognis Corporation, Emery Group).

TABLE 2

| FORMULATION 2 | % Equivalents |
| --- | --- |
| Versadyme ® VD58 | 76.8 |
| Triple Press Stearic Acid (source: Emery) | 22.6 |
| Azelaic Acid (source: Emery) | 0.6 |
| Ethylene diamine | 80.2 |
| Hexamethylene diamine | 19.8 |

Procedures for preparation of the polyamide resin are well known in the art as described, e.g., in U.S. Pat. 5,138,027, the entire contents of which are incorporated herein by reference. It is contemplated that any suitable procedure for preparing a polyamide resin known to those skilled in the art may be utilized herein, so long as the ratio of acid equivalents to amine equivalents yields a polyamide suitable for non-bloom applications, as discussed above. In a preferred embodiment, preparation of the polyamide resin involves charging the acid and amine reactants shown in Tables I or II to a reactor along with an acid catalyst, e.g., phosphoric acid. The reaction mixture is then heated to a temperature of from about 380° F. to about 420° F. and held for about 1 to about 2.5 hours at that temperature.

The wax component generally has a melting point ranging from about 175° F. to about 650° F. or to about 700° F., although some suitable waxes may have lower melting points. The wax component may be present in an amount of from about 0.1% to about 49% by weight of the composition and more preferably ranges from about 0.1% to about 20% by weight, even more preferably 0.5% to about 10% by weight, and most preferably 0.5% to about 5% by weight, based on the weight of the composition. Suitable waxes include polyethylene (PE) wax, polytetrafluoroethylene (PTFE) wax, mixed PE/PTFE wax, mixed carnauba/PE wax, ethylene bisstearamide wax and combinations thereof.

The mixed PE/PTFE wax can contain PE or PTFE in an amount ranging from about 5 to about 95 percent by weight and more preferably from about 10 to about 90 percent by weight of the wax. The melting point of suitable PE wax generally ranges from about 175° F. to about 275° F., and the melting point of suitable PTFE generally is greater than about 600° F. and may range from about 600° F. to about 700° F.

Examples of particularly suitable waxes are PE waxes commercially available from MicroPowders, Inc. in Tarrytown, N.Y. under the tradename "MPP-620XF", or Carroll Scientific Corp. in Countryside, Ill. under the tradename "Pinnacle 1555"; mixed PE/PTFE waxes commercially available from MicroPowders, Inc. under the tradenames "PolyFlou 523 IF" and "PolyFlou 190"; ethylene bisstearamide commercially available from Carroll Scientific Corp. in Countryside, Ill. under the tradename "P2500"; mixed carnauba/PE waxes commercially available from Shamrock Technologies, Inc. in Newark, N.J. under the tradename "S-232"; and PE/PTFE waxes commercially available from Daniel Products Co. in Jersey City, N.J. under the tradenames "SLIPAYD SL-600" and "SLIPAYD SL-810".

The polyamide resin/wax compositions described herein can be prepared by mixing in any suitable manner. For example, powdered resin and powdered wax may be combined, triturated and then heated. Alternatively, powdered wax may be dispersed by mixing with molten polyamide resin. The mixture may optionally be heated to above the melting point of the wax. The molten resin/wax composition is extruded through a die or spinnerette and is solidified by quenching in a water bath. The solidified composition is chopped into pellets and the water adhering to the pellets is removed. The pellets may then be pulverized into a powder, if desired.

The invention can be further illustrated by the following non-limiting examples in which all percentages are by weight.

EXAMPLE 1

A polyamide resin of Formulation 1 which is described in Table 1 is prepared by charging the acid and amine reactants (total weight 120 grams) to a reactor along with about 1% of an 85% solution of phosphoric acid. The reaction mixture is heated to a temperature of about 400° F. and held for 1 hour at that temperature. After all water is removed, a vacuum of 35mm Hg is pulled for one hour and a nitrogen blanket applied. The resulting resin is pelletized.

The pelletized polyamide resin is then placed in a vessel and melted. Powdered PE/PTFE wax (2.0 grams) obtained from Daniel Products Co., in Jersey City, N.J. under the tradename "SL-810" is added to the molten polyamide resin and stirred. The polyamide resin/wax composition is then cooled and extruded through a spinnerette, followed by quenching the composition in a cold water bath. The solidified polyamide resin/wax composition is chopped into pellets and forms a slurry with the water. The water is then removed from the pellets.

EXAMPLE 2

The polyamide resin of Formulation 2 which is described in Table 2 was prepared by charging the acid and amine reactants (total weight 306.78 grams) to a reactor along with about 1% of an 85% solution of phosphoric acid. The reaction mixture was heated to a temperature of about 400° F. and held for 1 hour at that temperature. After all water was removed, a vacuum of 35 mm Hg was pulled for one hour and a nitrogen blanket was applied. The resulting resin was pelletized.

118.8 grams of pelletized polyamide resin (Formulation 2) was then placed in a vessel and melted. Powdered PE/PTFE wax (1.2 grams) obtained from Daniel Products Co. in Jersey City, N.J. under the tradename "SL-810" was added to the molten resin and stirred. The polyamide resin/wax composition was cooled and extruded through a spinnerette, followed by quenching the composition in a cold water bath. The solidified polyamide resin/wax composition was chopped into pellets and formed a slurry with the water adhering. The water was then removed from the pellets.

EXAMPLES 3–17

The resistance of the polyamide resins described above to scratching, scuffing and blooming was tested using the following procedure. Waxes in powder form were added to a sample of ground polyamide resin of Formulation 1 which is described in Table 1. A conventional black offset ink was then printed on white copy paper. Polyamide resin without wax was sprinkled onto one half of the print and the other half was covered with the polyamide/wax blend. The print was put through a lab thermographer, and each print was tested for bloom, scratch and scuff resistance. Bloom resistance was measured by placing the prints in an oven at 140° F. (60° C.) and measuring the gloss of each composition as compared with the control, the polyamide resin alone. Scratch and scuff resistance of the composition and the control were tested by the fingernail scratch test. The results are shown in Table 3 below.

TABLE 3

| EXAMPLE | PERCENT WAX | WAX TYPE | 60° GLOSS | OBSERVATION OF SCRATCH RESISTANCE |
|---|---|---|---|---|
| 3 | none | none | 79 | Formulation 1 |
| 4 | 5.0% | Ethylene Bisstearamide P2500 | 65 | slight improvement |
| 5 | 5.0% | Carnauba/PE | 70 | slight improvement |
| 6 | 5.0% | Micro Powders PolyFlou 523XF | 55 | IMPROVEMENT |
| 7 | 2.5% | Micro Powders PolyFlou 523XF | 64 | IMPROVEMENT |
| 8 | 1.0% | Micro Powders PolyFlou 523XF | 71 | IMPROVEMENT |
| 9 | 5.0% | Micro Powders MPP-620VF | 30 | IMPROVEMENT |
| 10 | 2.5% | Micro Powders MPP-620VF | 71 | IMPROVEMENT |
| 11 | 1.0% | Micro Powders MPP-620VF | 78 | IMPROVEMENT |
| 12 | 0.5% | Micro Powders MPP-620VF PE | 78 | IMPROVEMENT |
| 13 | 1.0% | Carroll Scientific Pinnacle 1555 PE | 79 | IMPROVEMENT |
| 14 | 0.5% | Carroll Scientific 1555 PE | 76 | IMPROVEMENT |
| 15 | 1.0% | Daniel Prod. SlipAyd SL-600 PE/PTFE | 64 | slight improvement |
| 16 | 1.0% | Daniel Prod. SlipAyd SL-810 PE/PTFE | 62 | IMPROVEMENT |
| 17 | 1.0% | Micro Powders Polyflou 190 PE/PTFE | 71 | IMPROVEMENT |

As can be seen from the foregoing comparative Examples 3–17, the addition of wax improved the scratch and scuff resistance of the polyamide resin and significantly reduced the bloom as measured by the 60° Gloss.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A composition comprising: (a) from about 51% to about 99.9% by weight of a polyamide resin component; and (b) from about 0.1% to about 49% by weight of a wax component, wherein the polyamide resin component comprises a reaction product obtained by reaction of a dimerized fatty acid reactant, a carboxylic acid reactant and a diamine reactant.

2. The composition according to claim 1, wherein the polyamide resin component is present in an amount of from about 80% to about 99.9% by weight and the wax component is present in an amount of from about 0.5% to about 20% by weight.

3. The composition according to claim 1, wherein the polyamide resin component is present in an amount of from about 90% to about 99.5% by weight and the wax component is present in an amount of from about 0.5% to about 10% by weight.

4. The composition according to claim 1, wherein the polyamide resin component is present in an amount of from about 95% to about 99.5% by weight and the wax component is present in an amount of from about 0.5% to about 5% by weight.

5. The composition according to claim 1, wherein the polyamide resin component has an acid value (AV) and an amine value (AmV), such that (AV)–(AmV) is greater than about 4.

6. The composition according to claim 1, wherein a ratio of acid equivalents to amine equivalents in said reaction of the dimerized fatty acid reactant, the carboxylic acid reactant and the diamine reactant is greater than 1.

7. The composition according to claim 1, wherein a ratio of acid equivalents to amine equivalents in said reaction of the dimerized fatty acid reactant, the carboxylic acid reactant and the diamine reactant is greater than or equal to about 1.02.

8. The composition according to claim 1, wherein a ratio of acid equivalents to amine equivalents in said reaction of the dimerized fatty acid reactant, the carboxylic acid reactant and the diamine reactant is greater than or equal to about 1.04.

9. The composition according to claim 1, wherein a ratio of acid equivalents to amine equivalents in said reaction of the dimerized fatty acid reactant, the carboxylic acid reactant and the diamine reactant is greater than or equal to about 1.05.

10. The composition according to claim 1, wherein the dimerized fatty acid reactant is at least partially hydrogenated.

11. The composition according to claim 6, wherein the dimerized fatty acid reactant has an iodine value equal to or less than about 110.

12. The composition according to claim 6, wherein the dimerized fatty acid reactant has an iodine value equal to or less than about 95.

13. The composition according to claim 1, wherein the dimerized fatty acid reactant comprises a tall oil fatty acid dimerization product having a dimer content of about 97%, a monomeric content of about 1%, and a trimeric content of about 2%.

14. The composition according to claim 1, wherein the carboxylic acid reactant comprises a mixture of a monocarboxylic acid and a dicarboxylic acid.

15. The composition according to claim 10, wherein the monocarboxylic acid comprises a fatty acid having from about 16 to about 20 carbon atoms and the dicarboxylic acid has from about 6 to about 10 carbon atoms.

16. The composition according to claim 11, wherein the monocarboxylic acid is selected from the group consisting of stearic acid, isostearic acid, triple pressed stearic acid and mixtures thereof, and wherein the dicarboxylic acid comprises azelaic acid.

17. The composition according to claim 1, wherein the diamine reactant comprises ethylene diamine.

18. The composition according to claim 1, wherein the diamine reactant comprises a mixture of ethylene diamine and hexamethylenediamine.

19. The composition according to claim 1, wherein the diamine reactant further comprises a polyamine.

20. The composition according to claim 1, wherein the wax component comprises a member selected from the group consisting of polyethylene waxes, polytetrafluoroethylene waxes, mixed polyethylene/polytetrafluoroethylene waxes, carnauba waxes, mixed carnauba/polyethylene waxes, ethylene bisstearamide waxes, and mixtures thereof.

21. The composition according to claim 1, wherein the wax component comprises a member selected from the group consisting of polyethylene waxes, polytetrafluoroethylene waxes, and mixed polyethylene/polytetrafluoroethylene waxes.

22. The composition according to claim 1, wherein the wax component comprises a mixed polyethylene/polytetrafluoroethylene wax.

23. A composition comprising: (a) from about 90% to about 99.9% by weight of a polyamide resin component; and (b) from about 0.1% to about 10% by weight of a wax component comprising a member selected from the group consisting of polyethylene waxes, polytetrafluoroethylene waxes, and mixed polyethylene/polytetrafluoroethylene waxes, wherein the polyamide resin component comprises a reaction product obtained by reaction of: (1) a tall oil fatty acid dimerization product having a dimer content of about 97%, a monomeric content of about 1%, and a trimeric content of about 2%, with (2) a mixture of a monocarboxylic acid having from about 16 to about 20 carbon atoms and azelaic acid, and (3) ethylenediamine; wherein the dimerization product is at least partially hydrogenated, and wherein a ratio of acid equivalents to amine equivalents in said reaction is greater than or equal to about 1.04.

24. A method of enhancing scratch and/or scuff resistance and reducing bloom in a thermographic ink, said method comprising:

(a) providing a substrate having a thermographic ink composition disposed thereon;

(b) coating the thermographic ink composition with a polyamide resin composition comprising: (a) from about 51% to about 99.9% by weight of a polyamide resin component; and (b) from about 0.1% to about 49% by weight of a wax component, wherein the polyamide resin component comprises a reaction product obtained by reaction of a dimerized fatty acid reactant, a carboxylic acid reactant and a diamine reactant; and (c) heating the substrate for an amount of time and at a temperature sufficient to melt the thermographic ink composition and the polyamide resin composition.

* * * * *